June 2, 1959 S. J. GARTNER ET AL 2,889,446
WELDING MACHINE
Filed March 3, 1958 5 Sheets-Sheet 1

INVENTORS
MARION S. DE LUCIA
STANLEY J. GARTNER

BY *Michael Hertz,*

ATTORNEY

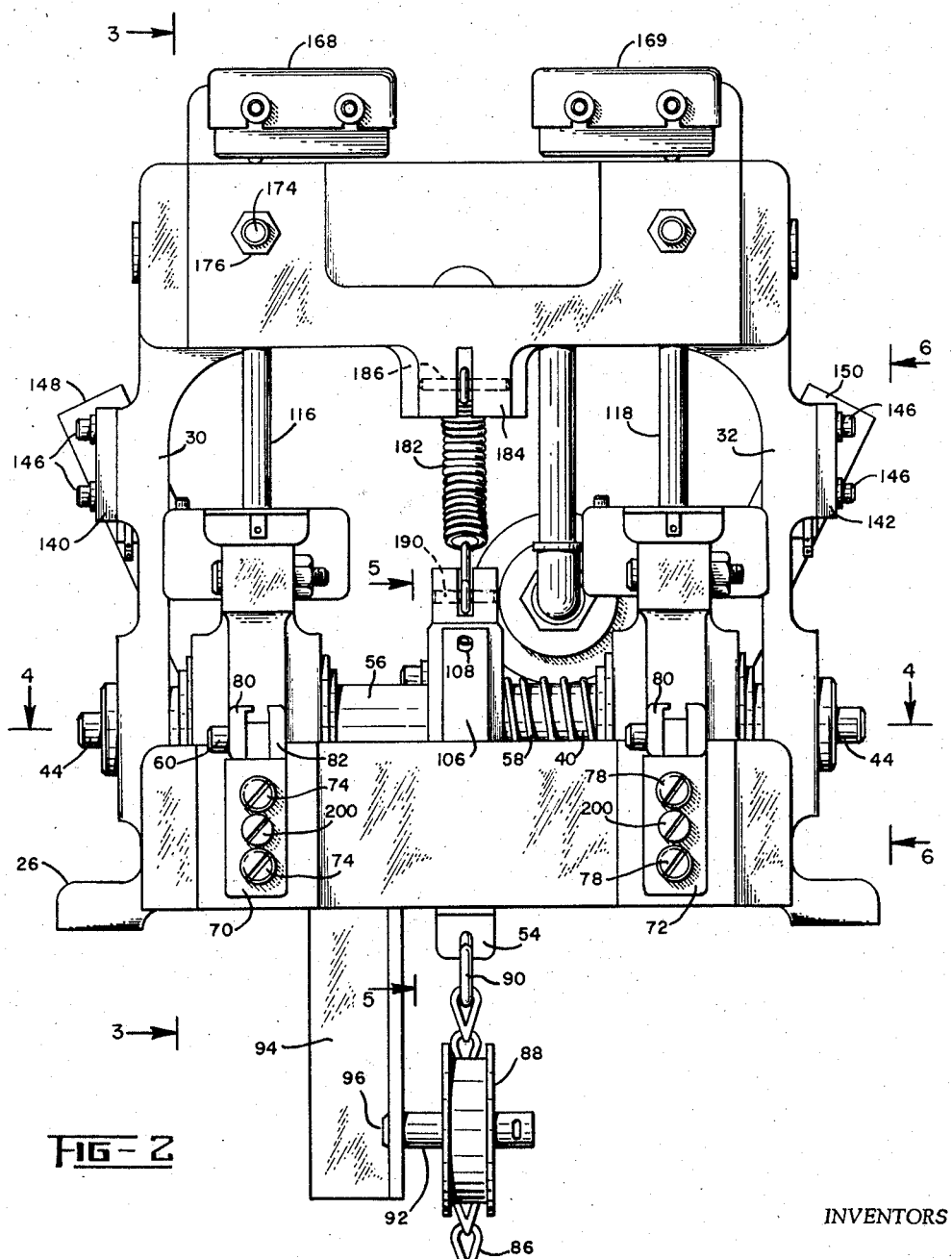

June 2, 1959  S. J. GARTNER ET AL  2,889,446
WELDING MACHINE

Filed March 3, 1958  5 Sheets-Sheet 3

INVENTORS
MARION S. DE LUCIA
STANLEY J. GARTNER
BY Michael Hertz
ATTORNEY

INVENTORS
MARION S. DE LUCIA
STANLEY J. GARTNER
BY Michael Hertz
ATTORNEY

June 2, 1959 S. J. GARTNER ET AL 2,889,446
WELDING MACHINE
Filed March 3, 1958 5 Sheets-Sheet 5

INVENTORS
MARION S. DE LUCIA
STANLEY J. GARTNER
BY Michael Hertz
ATTORNEY though the description may best be understood with reference to the

United States Patent Office

2,889,446
WELDING MACHINE

Stanley J. Gartner and Marion S. De Lucia, Emporium, Pa., assignors to Sylvania Electric Products Inc., a corporation of Massachusetts Application March 3, 1958, Serial No. 718,594

14 Claims. (Cl. 219—86)

This invention relates to spot welding machines and more particularly to dual position spot welding machines for successively welding workpieces of different thicknesses and under various conditions of weld current and weld pressure.

An object of the invention is to provide a spot welding machine which shall be capable of providing separate conditions for the operation of each of the pairs of electrodes.

A more specific object of the invention is to provide a spot welding machine which shall be capable of providing separate and distinct time-current-pressure conditions for the individual pairs of electrodes at each welding position.

These objects are fulfilled in accordance with the invention by the provision of a spot welding machine including two pairs of electrodes, each pair comprising an upper or movable electrode and a lower or stationary electrode.

Fig. 2 is a front elevational view of the same machine as Fig. 1, and showing a portion extending below the bench, the bench being removed.

The novel features believed characteristic of the invention are set forth in the appended claims. The invention itself, together with further objects and advantages thereof may best be understood with reference to the following detailed description taken in conjunction with the associated drawings showing one embodiment of the dual position spot-welding machine.

Figure 1:
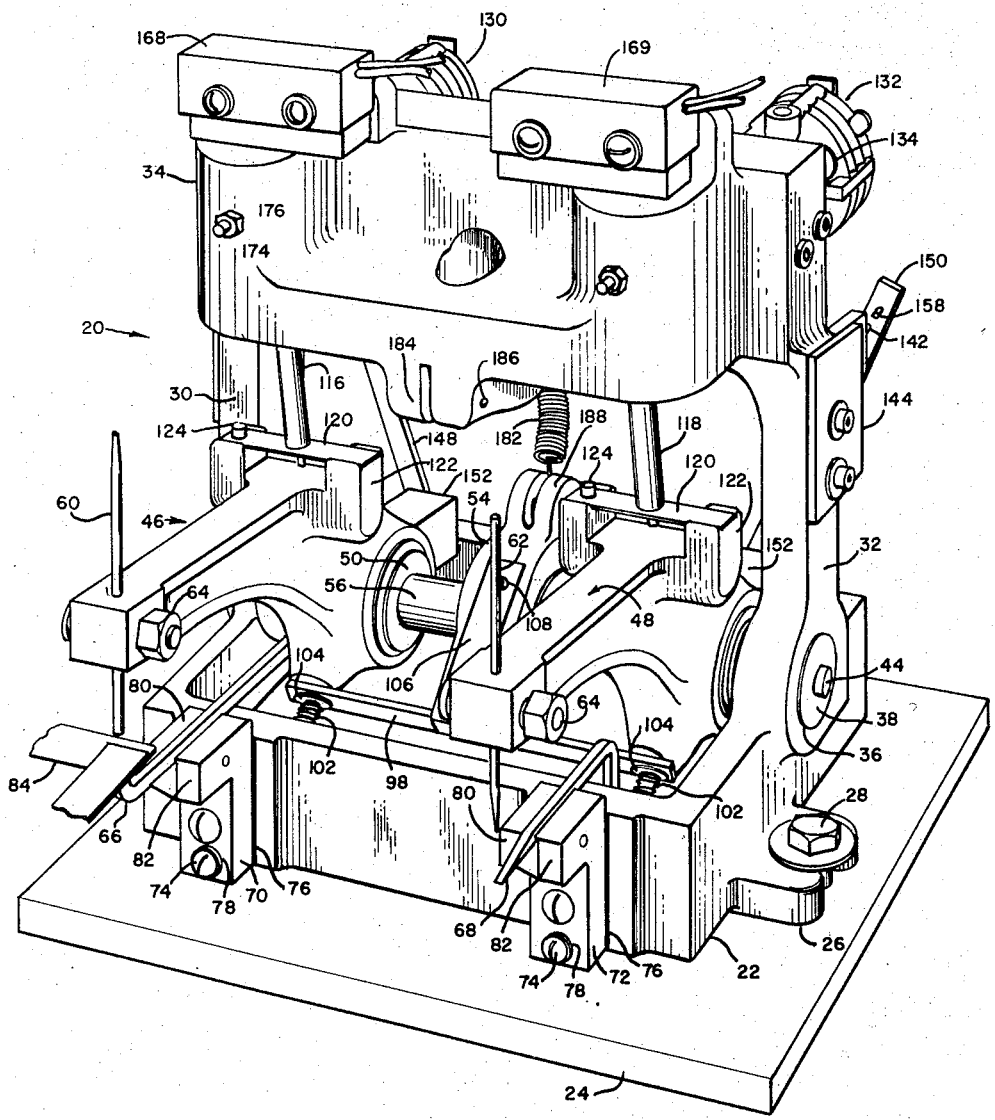
Fig. 1 is a perspective view of the spot welding machine of this invention.

Referring to the drawings and more particularly to Fig. 1, the welding apparatus illustrated includes a box frame 20 comprising a base portion 22 adapted to be fastened to a bench or table top 24, as by means of lugs 26 and bolts 28, columns 30 and 32 extending upwardly from opposed sides of the base 22, and a head portion 34 at the upper ends of the columns forming a bridge therebetween.

Figure 4:
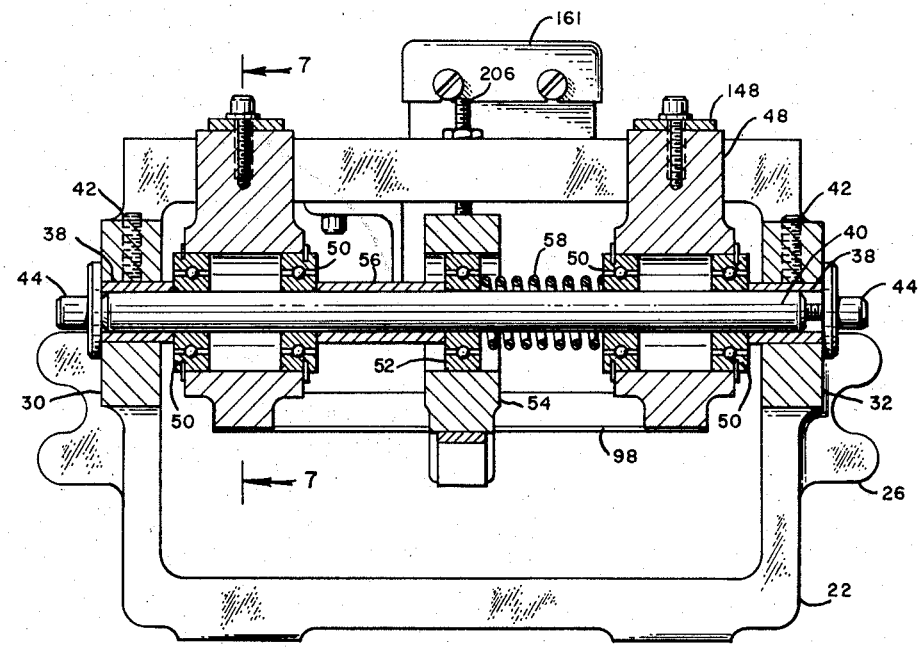
Fig. 4 is a sectional view taken on the line 4—4 of Fig. 2, depicting the mounting arrangement for a movable electrode holder and initiating arm assembly.

A stationary shaft 40 is horizontally mounted between the columns 30 and 32. Referring to Fig. 4, each column contains a bearing hole 36 for receiving a bushing 38 in which the stationary shaft 40 is mounted. Each bushing is held in position by a retaining pin 42. Any suitable means for preventing rotation of the shaft may be used, such as means for causing the bushings to compress about and seize the shaft to thus prevent rotational movement thereof. A large head cap screw 44 threaded into each end of the shaft 40 and bearing against the frame further restrains movement of the shaft particularly in a direction parallel to its longitudinal axis.

Movable electrode holder arms 46 and 48 are pivotally mounted on the stationary shaft by means of roller bearings 50. Intermediate the movable electrode holder arms and pivotally mounted on the shaft 40 by means of roller bearings 52 is an actuator or initiating arm 54. The movable arms 46 and 48 and the initiating arm 54 are maintained in spaced relationship on the shaft 40 by a rigid spacer sleeve 56 mounted on said shaft and in between one of the movable arms 46 and the initiating arm 54, and by an expansion spring 58, spiraling the shaft and interposed between the initiating arm 54 and the other movable arm 48. The ends of the expansion spring press against the vertical side faces of bearings 50 and 52 causing separation of the same and together with the spacer sleeve 56, the spring establishes the relative positions of the movable electrode holder arms 46 and 48 and the initiating arm 54 on the stationary shaft 40.

Figures 3, 7:
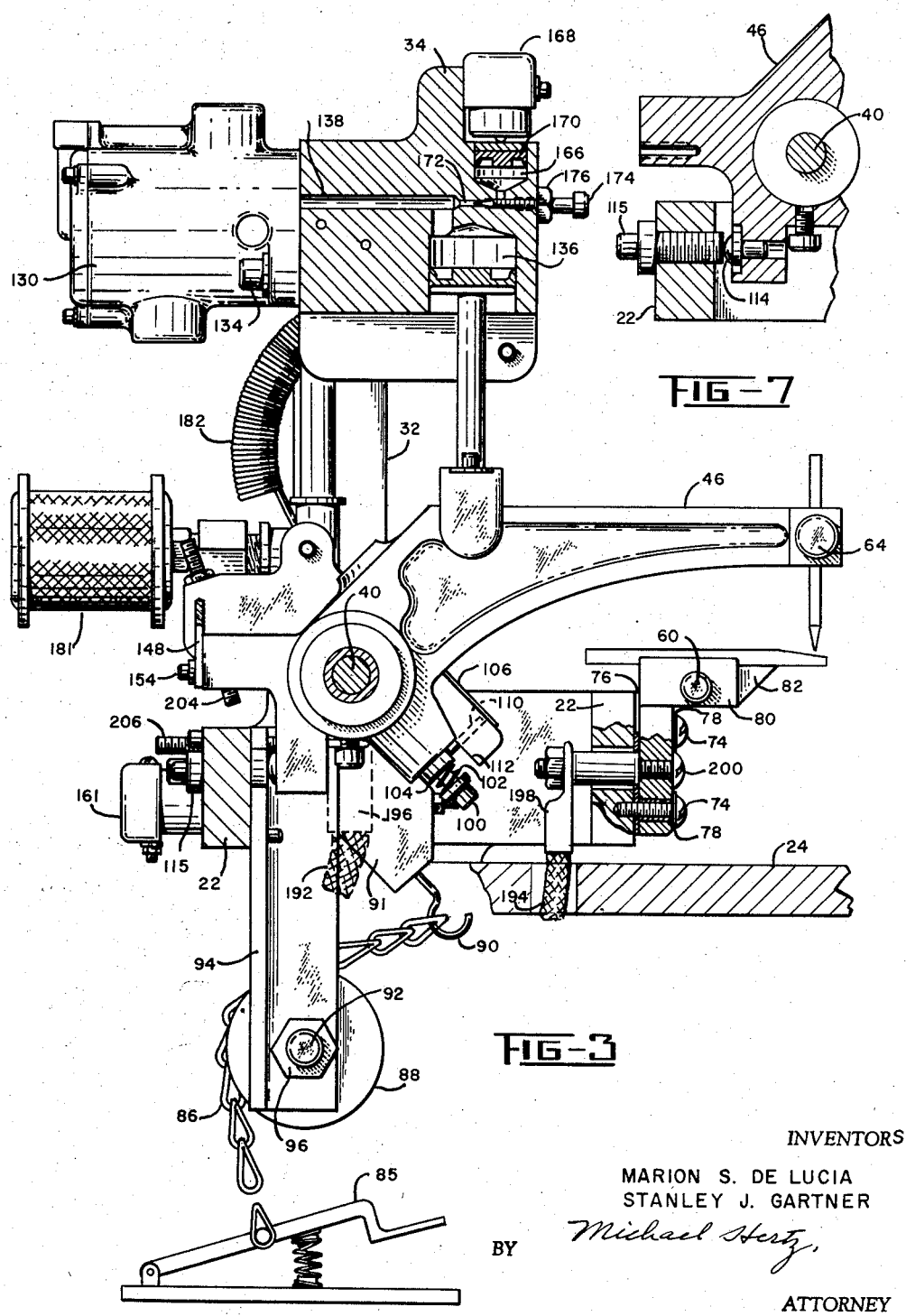
Fig. 3 is a side elevational view of the machine, shown partially in section, taken on the line 3—3 of Fig. 2.
Fig. 7 is a detail view, partly in elevation and partly in section, taken on line 7—7 of Fig. 4 of an air gap adjustment means for an electrode.

Referring now to Fig. 1, a pair of movable electrodes 60 and 62 are adjustably mounted on forwardly extending portions of the movable electrode holder arms 46 and 48, respectively, by means of bolts 64. A pair of stationary electrodes 66 and 68 are disposed below the movable electrodes 60 and 62, respectively. The stationary electrodes are adjustably mounted on stationary electrode holders 70 and 72, which are insulatingly mounted on the front wall portion of the base 22 by mounting screws 74, as shown in Fig. 3. A spacer of insulating material 76 is interposed between the base 22 and each stationary electrode holder. The mounting screws 74 traverse enlarged or oversized holes in the stationary electrode holders, and through registering openings in the insulating material 76, and are threaded into the front wall portion of the base 22. An insulating flanged bushing 78 is used to further insulate the mounting screws from the electrode holders. Each holder receives its electrode between an adjustable clamping member 80 and a rigid clamping member 82. The clamping member 82 is an integral part of each of the stationary electrode holders 70 and 72, whereas the adjustable clamping member 80 is a detachable block adjustably mounted on clamping member 82 by a clamping bolt 60. This arrangement permits removal and replacement and adjustment of the stationary electrodes in the stationary electrode holders.

Each movable electrode is disposed above a stationary electrode and the same is adapted to confine between the electrodes a workpiece 84 to be welded. Downward movement of the movable electrodes 60 and 62 toward the stationary electrodes 66 and 68 is effected by the welding machine operator depressing a treadle 85, Fig. 3. Motion is imparted to the initiating arm 54 from the treadle, through a chain 86, which encircles a chain pulley 88 and which has one end attached to a chain hook 90 threaded into a downwardly extending portion of the initiating arm. The chain pulley is rotatably mounted on a shaft 92, which is rigidly mounted on one face of an elongated L-shaped support member 94 extending downwardly from the base 22, as by a nut 96.

Figure 5:
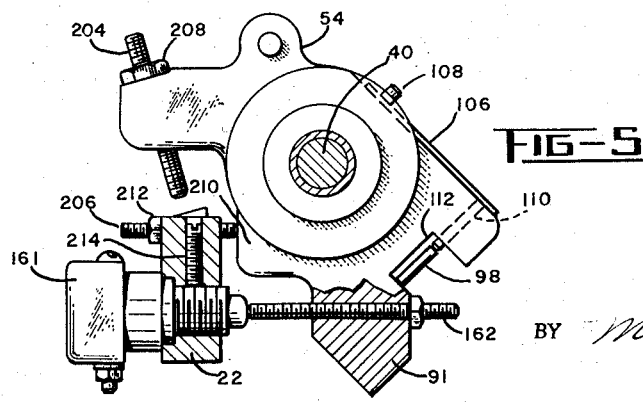
Fig. 5 is an enlarged side elevational view, partially in section, of a fluid pressure control switch and initiating arm assembly.

Motion is imparted to the movable electrode holder arms 46 and 48 from the initiating arm 54 through an elongated equalizer bar 98, as shown in Figs. 1, 3 and 5. The equalizer bar 98 is connected at its ends to the movable arms 46 and 48 by universal connections. In the illustrated embodiment of the invention, a socket head cap screw 100 is threaded into each movable arm and connections are obtained by adopting the following construction at each end of the equalizer bar: The unthreaded body portion of the cap screw 100 traverses an elongated hole near the end of the equalizer bar and a spring 102, surrounding the screw, is interposed between the equalizer bar and the bearing surface of the cap screw head. The springs 102, through the compressive action of the screws 100, hold the equalizer bar flat against machined faces on the movable electrode holder arms. If desired, a flat washer 104 may be interposed between one end of the spring 102 and the equalizer bar 98 to prevent the spring from penetrating or becoming jammed in the elongated hole in said bar. A leaf spring 106, which is fixedly mounted at one end by a fillister head cap screw 108 threaded into the top portion of the initiating arm 54, urges a stud 110, as shown in Fig. 5, against the upper portion of the equalizer bar 98 thereby causing the same to be resiliently held against the lower bearing surface of a groove or bifurcation 112 in the initiating arm 54.

By reason of the above described arrangement, downward pull on the chain 86 causes the initiating arm 54 to pivot about the stationary shaft 40. Motion is translated from the initiating arm 54 through the equalizer bar 98 to the electrode holder arms 46 and 48 causing the movable electrodes 60 and 62 to conjointly move toward the stationary electrodes 66 and 68 until one of the electrodes makes contact with a workpiece 84 to be welded. For example, if a workpiece 84 were placed in welding position on stationary electrode 66, as depicted in Fig. 1, the movable electrodes will move as if they were rigidly interconnected until the movable electrode 60 makes contact with and is arrested in the motion by the workpiece; but the other or idling electrode 62 continues to move until its downward movement is arrested by a button stop 114, as shown in Fig. 7, rigidly mounted on the rear face of the downwardly extending portion of each movable electrode holder arm, engaging an adjustable stop 115 threaded into the rear wall of the base 22. The further movement of the idling electrode is effected by one end of the equalizer bar 98 moving with respect to that screw 100 which is mounted on the movable electrode holder arm whose electrode makes contact with the workpiece, while the other end of the equalizer bar exerts force against the idling electrode holder arm thereby continuing the downward movement of the idling electrode. The action of the springs 102 is to return the movable arms into alignment after a weld has been completed under one pair of electrodes and the movable electrodes are again raised and also insures that the movable arms rotate as a unit until one movable electrode makes contact with the work. The adjustable stop 115 provides a means for establishing an air gap between the movable and stationary electrodes, of the idle pair, with the proper spacing. It is noted that engagement of a movable electrode holder arm with its button stop occurs only when that arm moves and the motion of its electrode is not arrested by contact with a workpiece. If no workpiece is between a pair of electrodes, an air gap remains due to the arresting action of the stop 115.

The movable electrode holder arms 46 and 48 are adapted to be driven with force toward the stationary electrode holders 70 and 72 by means of pneumatically or liquid controlled piston rods 116 and 118, respectively, so that the tips of the movable and stationary electrodes may engage the article to be welded with substantial pressure. A cantilever flat spring 120, see Fig. 1, spans the legs of an inverted yoke-like structure 122, cast integral with the upper portion of each movable electrode holder arm, and is rigidly fastened at one end by a cap screw 124 threaded into one leg of the yoke. The other end of the spring rides free atop the other leg. The flat spring 120 constitutes a frictionless energy reservoir for rapid pressure follow-up on the weld work. This rapid pressure follow-up is utilized from the moment welding current begins to pass through the weld work, that is when the weld work is in a solid state, and continuously during the time the work becomes plastic under the influence of weld current through the same. The lower ends of the piston rods 116 and 118 are fastened to the springs 120 at points intermediate of the yoke legs and the upper ends are connected to pistons 126 slidably arranged in pressure cylinders 128 disposed within the head portion 34.

Figures 6, 8:
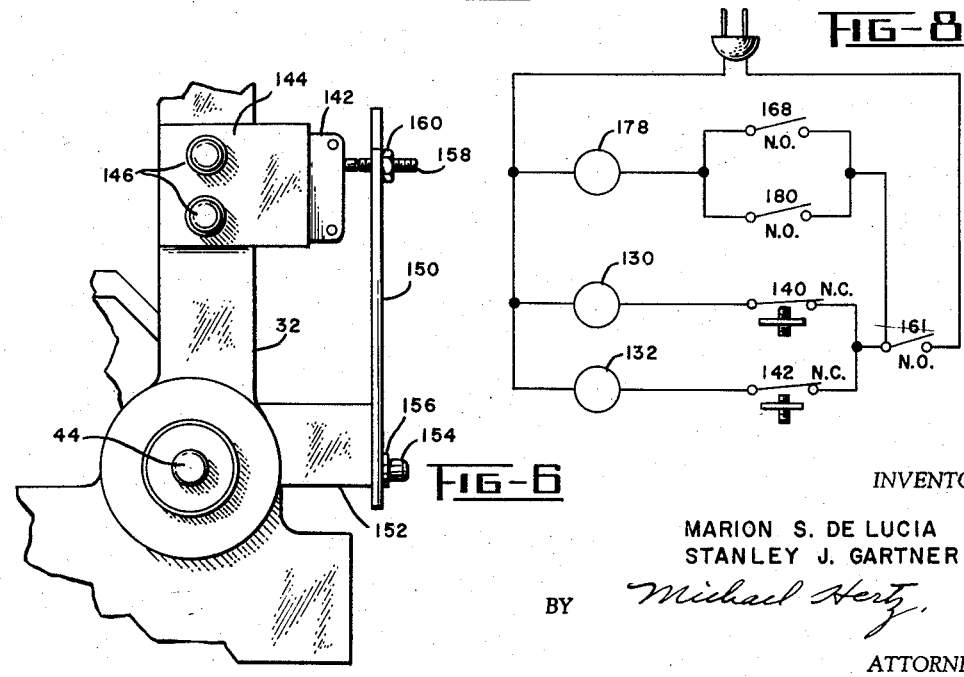
Fig. 6 is an enlarged fragmentary side view of the machine showing a pressure regulating valve switch and actuator bar assembly.
Fig. 8 is a schematic diagram of an electrical switching circuit for operating the spot-welding machine of this invention.
Figure 9:
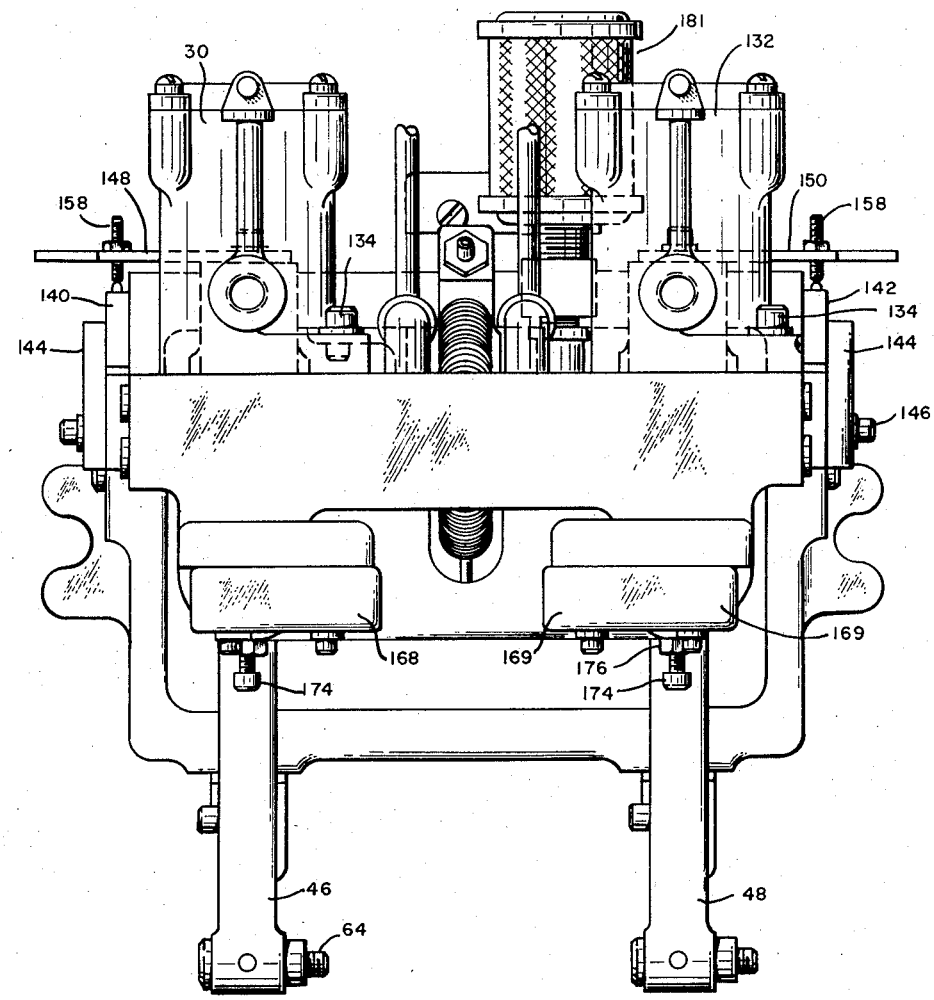
Fig. 9 is a top plan view of the same machine as Fig. 1.

Referring to Figs. 3, 8 and 9, fluid pressure solenoid operated regulating valves 130 and 132, fixedly mounted on the rear face of the head portion 34 by socket head screws 134, are adapted to admit fluid pressure from a source of fluid under pressure to the main pressure cylinders 136 via a fluid conduit 138 to actuate the pistons 140 and piston rods 116 and 118, respectively. The fluid conduits and main pressure cylinders are cast integral with the head portion 34.

The valves 130 and 132 are controlled by parallely connected normally closed switches 140 and 142 rigidly mounted on brackets 144 attached on each to the vertical columns 30 and 32 by screws 146 threaded into said columns. The normally closed switches 140 and 142 are adapted to be opened by switch actuating bars 148 and 150 each of which is rigidly mounted, at one end, on the rearwardly extending portion 152 of a movable electrode holder arm. Fig. 6 illustrates an arrangement for a switch 142 and an actuating bar 150. A socket head cap screw 154 and a lock washer 156 is used to fixedly mount each switch actuating bar to the movable electrode holder arms. At the other or free end of each bar is an adjustable switch button actuating means, such as a stud 158 threaded through the bar and which is held in adjustment by a lock nut 160.

A fluid pressure firing switch 161 is mounted directly behind the initiating arm 54 on a vertical portion of the rear wall of the base 22, as shown in Fig. 5, and is adapted to be closed by a stud 162 threaded through a downwardly extending portion 91 of the initiating arm. This normally open switch 161, as shown in Fig. 8, is adapted to connect the normally closed switches 140 and 142 and the solenoids of the fluid pressure regulating valves 130 and 132 across a power source.

In the operation of the welder, the switch actuating bars 148 and 150 move conjointly toward the normally closed switches as the movable electrodes are moved toward the stationary electrodes. With a workpiece placed between one pair of electrodes, the downward movement of the top electrode will be arrested by said workpiece so that the switch actuating bar mounted on its electrode holder arm will not move sufficiently to effect opening of the associated normally closed switch. This, of course, leaves the solenoid associated with the unactuated normally closed switch in a cocked or ready position. The idling electrode holder arm, however, moves farther due to the force exerted on it by the equalizer bar and its switch actuating bar moves sufficiently to cause the other normally closed switch to open and thus disable its associated solenoid. At this point, that pair of electrodes which has the workpiece therebetween is in physical contact with the workpiece as a result of pressure being applied to the treadle by the operator. The fluid pressure regulating valve associated with that pair of electrodes is in readiness to meter regulated fluid pressure to its particular pressure cylinder so that welding pressure can be applied through said electrodes to the workpiece. It is desirable that welding pressure be applied just after one of the upper electrodes has made contact with the workpiece in order to avoid fluid pressure being inadvertently admitted to the weld head and causing said movable electrode to make contact with the workpiece with impact. One way this may be accomplished is by adjusting the fluid pressure system firing switch 161 to close the circuit to the cocked solenoid just after contact with the workpiece is made. Switch 161 is actuated by means of a stud 162 adjustably mounted on the initiating arm 54. In practice, the stud is adjusted to have about 0.032 inch additional over-travel to close switch 161 after the upper electrode makes contact with the workpiece.

The energizing of one of the fluid pressure regulating valves allows regulated fluid pressure to be permitted to a particular fluid pressure cylinder and its corresponding pilot cylinder 166, as shown in Fig. 3. It is noted that one fluid pressure supply only is needed to furnish two separate welding pressures to the weld head, inasmuch as the left fluid pressure regulating valve meters one regulated adjustable fluid pressure to the left main pressure cylinder and the other valve meters another separate regulated and adjustable fluid pressure to the right main pressure cylinder. A normally open welding current switch 168 is fixedly mounted on the head portion 34 above the pilot cylinder. A welding current switch is provided for each pair of electrodes. The welding current switch is adapted to be actuated by a pilot piston 170 slidably arranged in the pilot cylinder 166. Metered fluid pressure is admitted to the pilot cylinder via a bleeder conduit 172 communicating between the main fluid conduit 138 and the pilot cylinder. A needle valve 174, of the usual kind, is threaded into the head portion 34 and is held in adjustment by a lock nut 176. By turning the socket head portion of the needle valve, the effective size of the opening to the pilot cylinder may be controlled, and hence the flow or quantity of compressed fluid entering said cylinder per unit of time may be regulated. In this manner, the time interval between the application of weld pressure and the initiation of welding current may be controlled.

Referring to Fig. 8, welding current switches 168 and 169 are connected in series with a relay 178 which may be of the time controlled opening type. When the selected current switch closes, relay 178 is energized and connects a welding transformer across the electrodes. Weld current will continue as long as the relay is energized. When the operator releases the treadle, fluid pressure system firing switch 161 opens up allowing the exhausting fluid pressure to exhaust via a muffler 181 and to open the welding current switch and stop the weld current when the relay circuit 178 is de-energized.

Upon completion of the weld, pressure on the treadle is released and the movable electrode holder arms 46 and 48 move upward and away from the stationary electrodes 66 and 68 due to the action of a stiff coiled spring 182. One end of the spring is pivotally mounted in a bifurcation 184 cast integrally with a lower portion of the head 34 by a pin 186 traversing the bifurcation and closed end portion of the spring. The other end of the spring is pivotally mounted in a bifurcation 188 on an upper portion of the initiating arm 54 in a similar manner by a pin 190. Between the two pins, the spring is stressed in a normally bowed condition. During the welding operation, the spring 182 is further bowed by the upward movement of the upper portion of the initiating arm 54 resulting from the pressure applied to the treadle. Upon removal of the pressure on the treadle, the bowed spring exerts force downwardly on the initiating arm causing the same to move to its standby position. This motion of the initiating arm is translated to the movable electrode holder arms 46 and 48 by the equalizer bar 98, thereby causing the movable electrodes 60 and 62 to move upward and away from the stationary electrodes 66 and 68.

Referring to Fig. 3, the electrodes are supplied with welding current through conductors 192 and 194, which terminate in heavy duty terminal lugs 196 and 198, respectively. Lug 196 is rigidly mounted on the frame 20 and in electrical contact therewith. Connection is made between terminal lug 198 and the stationary electrode holder 70 by a volt 200 threaded through the vertical body portion of said holder. In the illustrated embodiment of this invention, good electrical contact may be obtained as by means of a spacer bushing 202 interposed between the terminal lug and the electrode holder.

Referring to Fig. 5, limitation on pivotal movement of the initiating arm 54 about the stationary shaft 40 is effected by studs 204 and 206. The stud 204 is threaded through a rearwardly extending portion of the initiating arm and it is locked in adjustment by a nut 208. The stud 206 is threaded through the rear wall of the base portion 22 in such position that the arresting end of the stud might engage a downwardly extending portion 210 of the initiating arm 54 when the treadle is depressed. A lock nut 212 is used to hold the stud in adjustment. A retaining screw 214 threaded into the rear wall of the base portion 22 and urging against the keyed channel in the switch 161 is used to hold the switch in position and prevent rotation.

It will be appreciated from the foregoing description that the present invention provides a very flexible dual position spot welding machine which is capable of providing separate and distinct time-current-pressure conditions for the individual pairs of electrodes at each welding position. It is treadle actuated with welding pressure applied by a fluid pressure system. Only one source of fluid pressure is needed to furnish two separate welding pressures to the weld head. The adjustable stops for the electrode holder arms provide a means for establishing an air gap between the idle pair of electrodes to prevent unnecessary current drain. The equalizer bar construction and its universal connections to the electrode holder arms permits differential action of the movable electrode holder arms when weld work is at either position on the welder and the frictionless pressure follow up reservoir provides a means for assuring continued welding pressure on the weld work when the same is in a plastic state.

What is claimed is:

1. A welding apparatus comprising two fixed electrode holders adapted to retain electrodes, a like number of pivoted electrode holders also adapted to retain electrodes for welding cooperation with said first electrodes, an elongated equalizer bar having universal connections with said pivoted holders, and means operative on said equalizer bar at a point displaced from the connections of the equalizer bar with the pivoted holders for operating the same.

2. A welding apparatus comprising two fixed electrode holders adapted to retain electrodes, a like number of pivoted electrode holders also adapted to retain electrodes for welding cooperation with said first holders, an elongated equalizer bar having universal connections at its ends with said pivoted holders, and means operative on said equalizer bar intermediate the ends of same to move the second holders toward the first holders.

3. A welding apparatus comprising two fixed electrode holders adapted to retain electrodes, a like number of pivoted electrode holders also adapted to retain electrodes for welding cooperation with said first holders, an elongated equalizer bar having universal connections at its ends with said pivoted holders, and an actuator operative on said equalizer bar intermediate the ends of same, said actuator being loosely connected with said equalizer bar.

4. A welding apparatus comprising two fixed electrode holders adapted to retain electrodes, a like number of pivoted electrode holders also adapted to retain electrodes for welding cooperation with said first holders, an elongated equalizer bar having universal connections at its ends with said pivoted holders, an actuator operative on said equalizer bar intermediate the ends of same for translating the second holders, said actuator being loosely connected with said equalizer bar, and a spring means for urging said equalizer bar against said actuator.

5. A welding apparatus comprising two fixed electrode holders, adapted to retain electrodes, a like number of pivoted electrode holders also adapted to retain electrodes for welding cooperation with said first holders, an elongated equalizer bar having universal connections at its ends with said pivoted holders, an actuator operative on said equalizer intermediate the ends of same, said actuator being loosely connected with said equalizer bar, a spring means urging said equalizer against the actuator, and a means for arresting the movement of said pivoted holders toward said first holders.

6. A welding apparatus comprising two fixed electrode holders adapted to retain electrodes, a like number of pivoted electrode holders also adapted to retain electrodes for welding cooperation with said first holders, an elongated equalizer bar having universal connections at its ends with said pivoted holders, and an actuator operative on said equalizer bar intermediate the ends of the same, said actuator having a bifurcated portion loosely straddling the equalizer bar, one of the bifurcations having an opening therein and means including a spring having a portion passing through the opening and engaging the equalizer bar to urge the same against the companion bifurcation.

7. A welding apparatus comprising two fixed electrode holders adapted to retain electrodes, a like number of pivoted electrode holders also adapted to retain electrodes for welding cooperation with said first electrodes, an elongated equalizer bar having universal connections with said pivoted holders, an actuator operative on said equalizer bar at a point displaced from the connections of the equalizer bar with the pivoted holders for operating the same, electrodes in said holder, operator operated means connected with said actuator to shift the same to bring about contact of a movable electrode with a workpiece positioned on the companion electrode, a motor means for each of said pivoted holders, first and second control means respectively for each of said holders normally in positions to potentially render both of the motors effective to apply pressure to the movable electrode holders, each of said control means being operated to disrupt the potential effectiveness of said motors upon sufficient movement of its companion movable electrode holders, and a third control means in series with each of the first and second control means to render that motor means effective which is associated with that movable electrode which is arrested in its motion toward its companion by a workpiece between said electrodes.

8. A welding apparatus comprising two fixed electrode holders adapted to retain electrodes, a like number of pivoted electrode holders also adapted to retain electrodes for welding cooperation with said first electrodes, an elongated equalizer bar having universal connections with said pivoted holders, an actuator operative on said equalizer bar at a point displaced from the connections of the equalizer bar with the pivoted holders for operating the same, electrodes in said holder, operator operated means connected with said actuator to shift the same to bring about contact of a movable electrode with a workpiece positioned on the companion electrode, a motor means for each of said pivoted holders, first and second control means respectively for each of said holders normally in positions to potentially render both of the motors effective to apply pressure to the movable electrode holders, each of said control means being operated to disrupt the potential effectiveness of said motors upon sufficient movement of its companion movable electrode holders, and a third control means in series with each of the first and second control means to render that motor means effective which is associated with that movable electrode which is arrested in its motion toward its companion by a workpiece between said electrodes, means controlling the flow of welding current to the work engaging electrodes comprising a fourth control means interconnected with said first three control means, said intercommunication being made between the first and second control means on the one hand and the third control means on the other hand.

9. A welding apparatus comprising two fixed electrode holders adapted to retain electrodes, a like number of pivoted electrode holders also adapted to retain electrodes for welding cooperation with said first electrodes, an elongated equalizer bar having universal connections with said pivoted holders, an actuator operative on said equalizer bar at a point displaced from the connections of the equalizer bar with the pivoted holders for operating the same, electrodes in said holder, operator operated means connected with said actuator to shift the same to bring about contact of a movable electrode with a workpiece positioned on the companion electrode, a motor means for each of said pivoted holders, first and second control means respectively for each of said holders normally in positions to potentially render both of the motors effective to apply pressure to the movable electrode holders, each of said control means being operated to disrupt the potential effectiveness of said motors upon sufficient movement of its companion movable electrode holders, and a third control means in series with each of the first and second control means to render that motor means effective which is associated with that movable electrode which is arrested in its motion toward its companion by a workpiece between said electrodes, and an adjustable device for each of said motors for controlling the application of power to said motors.

10. A welding apparatus comprising a frame, two electrode holders rigidly attached to the frame and adapted to retain electrodes, a like number of electrode holders pivotally mounted in the frame and also adapted to retain electrodes for welding cooperation with said first electrodes, an elongated equalizer bar having universal connections with said pivoted holders, and means mounted in the frame and operative on said equalizer bar at a point displaced from the connections of the equalizer bar with the pivoted holders for operating the same.

11. A welding apparatus comprising a frame, two electrode holders rigidly attached to the frame and adapted to retain electrodes, a shaft mounted on the frame, two electrode holders pivotally mounted on the shaft and also adapted to retain electrodes for welding cooperation with said first electrodes, an elongated equalizer bar having universal connections with said pivoted holders, and means pivotally mounted on the shaft and operative on said equalizer bar at a point displaced from the connections of the equalizer bar with the pivoted holders for operating the same.

12. A welding apparatus comprising a frame, two electrode holders rigidly mounted to the frame and adapted to retain electrodes, a shaft mounted on the frame, two electrode holders pivotally mounted on the shaft and also adapted to retain electrodes for welding cooperation with said first holders, an elongated equalizer bar having universal connections at its ends with said second holders, and means pivotally mounted on the shaft and operative on said equalizer bar intermediate the ends of same to move the second holders toward the first holders.

13. A welding apparatus comprising a frame, two electrode holders rigidly mounted to the frame and also adapted to retain electrodes, a shaft mounted on the frame, two electrode holders pivotally mounted on the shaft and also adapted to retain electrodes for welding cooperation with said first holders, an elongated equalizer bar having universal connections at its ends with said second holders, and an actuator pivotally mounted on the shaft and operative on said equalizer bar intermediate the ends of same, said actuator being loosely connected with said equalizer bar.

14. A welding apparatus comprising a frame, two electrode holders rigidly mounted to the frame and also adapted to retain electrodes, a shaft mounted on the frame, two electrode holders pivotally mounted on the shaft and also adapted to retain electrodes for welding cooperation with said first holders, operator operated means for moving the second electrodes toward the first electrodes and in contact with a workpiece between the electrodes, and power means rendered effective after completion of motion of the operator operated means for effecting pressure of the second electrodes toward the first electrodes, said power means having a power operated rigid moving means and resilient means in series therewith and operative on each of the second electrode holders.

References Cited in the file of this patent

UNITED STATES PATENTS

| | | |
|---|---|---|
| 1,174,446 | Rietzel | Mar. 7, 1916 |
| 1,996,901 | Burns | Apr. 9, 1935 |
| 2,319,385 | Calvert | May 18, 1943 |
| 2,330,055 | Holloway | Sept. 21, 1943 |
| 2,375,439 | Rekosh | May 8, 1945 |